United States Patent
Emelyanov

(10) Patent No.: US 9,621,643 B1
(45) Date of Patent: Apr. 11, 2017

(54) SYSTEM AND METHOD FOR JOINING CONTAINERS RUNNING ON MULTIPLE NODES OF A CLUSTER

(71) Applicant: Parallels IP Holdings GmbH, Schaffhausen (CH)

(72) Inventor: Pavel Emelyanov, Moscow (RU)

(73) Assignee: Parallels IP Holdings GmbH, Schaffhausen (CH)

(*) Notice: Subject to any disclaimer, the term of this patent is extended or adjusted under 35 U.S.C. 154(b) by 90 days.

(21) Appl. No.: 14/814,576

(22) Filed: Jul. 31, 2015

(51) Int. Cl.
*H04L 29/08* (2006.01)
*H04L 12/24* (2006.01)

(52) U.S. Cl.
CPC ...... *H04L 67/1008* (2013.01); *H04L 41/5054* (2013.01)

(58) Field of Classification Search
None
See application file for complete search history.

(56) References Cited

U.S. PATENT DOCUMENTS

| | | | | |
|---|---|---|---|---|
| 5,841,762 | A * | 11/1998 | Hershey | H04J 3/1611 370/252 |
| 6,744,446 | B1 * | 6/2004 | Bass | H04Q 11/0478 709/223 |
| 9,124,633 | B1 * | 9/2015 | Eizadi | H04L 61/20 |
| 9,430,295 | B1 * | 8/2016 | Eizadi | G06F 9/45558 |
| 2008/0021835 | A1 * | 1/2008 | Ginter | G06F 21/00 705/51 |
| 2008/0120240 | A1 * | 5/2008 | Ginter | G06F 21/10 705/51 |
| 2008/0133415 | A1 * | 6/2008 | Ginter | G06Q 40/12 705/50 |
| 2009/0133110 | A1 * | 5/2009 | Kumar | H04L 29/12122 726/8 |
| 2010/0154516 | A1 * | 6/2010 | Hattori | G01M 3/329 73/40.7 |
| 2011/0047054 | A1 * | 2/2011 | Ginter | G06F 21/00 705/30 |
| 2012/0033996 | A1 * | 2/2012 | Takehara | G03G 15/0875 399/258 |
| 2012/0246317 | A1 * | 9/2012 | Eriksson | G06F 9/5072 709/226 |
| 2013/0024553 | A1 * | 1/2013 | Mittal | H04L 41/0893 709/222 |
| 2014/0258546 | A1 * | 9/2014 | Janssens | G06F 9/5088 709/226 |
| 2015/0222694 | A1 * | 8/2015 | Pandey | H04L 41/0803 709/220 |

(Continued)

*Primary Examiner* — Ninos Donabed
(74) *Attorney, Agent, or Firm* — Bardmesser Law Group

(57) ABSTRACT

A method for joining Containers and balancing loads uses a cluster of independent computer nodes assembled into a cloud service. The cluster nodes have Containers implemented on them. The Containers execute some real processes that use the resources of the node. If the Container requires additional resources (CPU, memory, etc.), the Container is provided with resources available from another node. In order to do this, the process requiring additional resources is migrated to another Container on a different node, and a proxy process imitates this process execution on the original Container. A load balancer monitors the resource usage and selects the Containers to be joined.

14 Claims, 4 Drawing Sheets

(56) References Cited

U.S. PATENT DOCUMENTS

| | | | |
|---|---|---|---|
| 2016/0043991 A1* | 2/2016 | Eizadi | H04L 61/20 |
| | | | 709/245 |
| 2016/0205519 A1* | 7/2016 | Patel | H04L 67/1002 |
| | | | 455/518 |
| 2016/0226937 A1* | 8/2016 | Patel | H04L 65/4061 |
| 2016/0315872 A1* | 10/2016 | Eizadi | G06F 9/45558 |

* cited by examiner

SYSTEM AND METHOD FOR JOINING CONTAINERS RUNNING ON MULTIPLE NODES OF A CLUSTER

BACKGROUND OF THE INVENTION

Field of the Invention

This invention relates to a method for managing resources and balancing loads in a computer cluster or a cloud, and more particularly, for joining virtual environments, such as Containers, residing on different nodes of the cluster in order to optimize loads and resource usage.

Description of the Related Art

A modern trend of virtualization presents some challenges with regard to resource usage by Containers and VMs, especially if they are running on nodes of a cluster or in a cloud structure. Conventional cluster systems have VMs/Containers running on a physical node and using resources of that particular node.

This conventional arrangement has some obvious shortcomings in terms of either overloading some nodes or wasting resources on some other nodes of the cluster. For example, a node has certain CPU and memory resources and the Container is launched on the node. The Container uses up all available CPU time, while some memory is still available. Thus, the extra memory is unused and basically wasted, because it cannot be used by another Container even on the same node (since there are no CPU resources left for launching another Container), not to mention by other Containers located on different nodes of the cluster. There is a need in the art to have a system where the Containers residing on a cluster node can use resources available on other nodes of the same cluster in order to optimizer resource usage and balance the operational loads.

Accordingly, a method for joining Containers residing on different nodes of a computer cluster in order to optimize resource usage is desired.

SUMMARY OF THE INVENTION

Accordingly, the present invention is directed to a method for joining Containers residing on different nodes of a computer cluster in order to optimize loads and resource usage that substantially obviates one or more of the disadvantages of the related art.

In one embodiment, a cluster of computer nodes implemented as a cloud is provided. The cluster nodes have Containers implemented on them. The Containers execute some processes that use the resources of the node.

To that end, a computer-implemented method for joining containers running on a cluster of hardware nodes includes, on a plurality of nodes connected into a cluster, the method begins starting a plurality of containers, where each node hosts at least one container. Next, executing a plurality of real processes in the containers, where each real process is executed on a single container and other containers execute a fake program module of the real process. Next, determining the real process to be migrated and a target container where the real process is to be migrated. For the target container, the fake program module is replaced with the real process, and the real process is replaced with the fake program module on another node. The fake program module includes interfaces that are functionally identical to interfaces of a corresponding real process. Interfaces of real processes are connected to a corresponding interfaces of the corresponding fake program modules so as to establish output data flow of the corresponding interfaces of corresponding fake program modules identical to the data flow outputted by an interface of corresponding real process. Interfaces of the fake program modules are configured to receive data from conjugated interfaces (i.e., from corresponding interfaces of the real processes or fake processes).

Here "conjugated" means that two or more interfaces cooperate and depend on each other. Coupling or conjunction may be performed as direct connections of interfaces via a local RAM or as indirect connections via TCP or any other connection mechanisms. The main reason for calling interface conjugated is strong dependence of the interfaces on each other. For example, in case of synchronous interprocess communication (IPC), a caller waits for a success confirmation from a receiver, so the proxy has to generate a confirmation, instead of real process. In case of asynchronous requests, getting confirmation is not critical.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
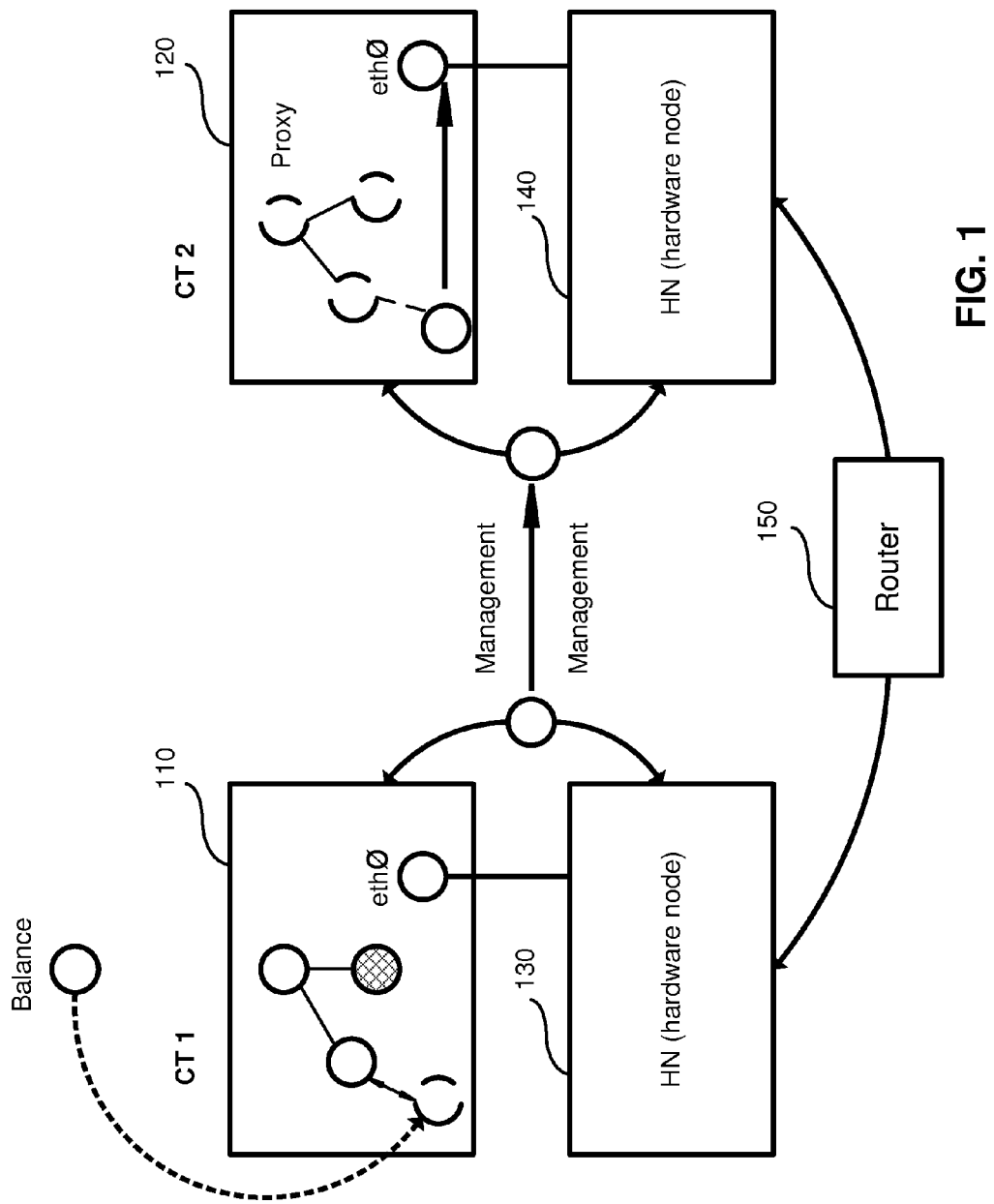
FIG. 1 illustrates a portion of a cluster with Containers running on the cluster nodes, in accordance with the exemplary embodiment.

Reference will now be made in detail to the preferred embodiments of the present invention, examples of which are illustrated in the accompanying drawings.

The present invention is directed to a method for the present invention is related to a method for deploying and testing application environments using semantic links. The following definitions are used throughout the description.

VEE—Virtual Execution Environment, a type of environment that supports program code execution, where at least a part of the real hardware and software required for running program code are presented as their virtual analogs. From the point of view of the user, the code in VEE runs as if it were running on the real computing system.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Virtual Private Server (VPS), is one type of a Virtual Execution Environment (VEE) running on the same hardware system with a single shared OS kernel and sharing most of the system resources, where isolation of Virtual Execution Environments is implemented on a namespace level. A Virtual Private Server (VPS), often referred to as a "Container," is a closed set, or collection, of processes, system resources, users, groups of users, objects and data structures. Each VPS has its own ID, or some other identifier, that distinguishes it from other VPSs. A container acts as an isolated virtual server within a single machine, where multiple sets of application services are organized on a single hardware node by placing each into an isolated virtual Container.

The VPS/Container offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc.

In other words, the full range of system administrator functions is desirable, as if the VPS were a dedicated remote server, with the existence of the VPS being transparent from the perspective of both the VPS user and the VPS administrator.

In one embodiment, a Meta PC cloud system is provided. The Meta PC is a system for supporting Cluster Computing (CC) primarily in LINUX OS systems. A cluster is a plurality of server nodes connected to each other and operating as a unit controlled by a common cluster control module. Applications distributed over the cluster run a finite set of processes that exchange data over the cluster communication system. In many cases, a portion of nodes can be idle (i.e., not involved in execution of the processes). The cluster control module allocates cluster resources and balances the loads on the nodes of the cluster.

In one embodiment, a cluster of computer nodes implemented in a cloud is provided. The cluster nodes have Containers implemented on them. The Containers execute some processes that use the resources of the node. If a Container requires additional resources (CPU, memory, etc.), the Container is provided with resources available from another node. In order to do this, the Container process requiring additional resources is migrated to another Container on a different node, and a proxy process replaces this process execution. A load balancer monitors the resource usage and selects the Containers to be joined.

The fake program modules that replace the real process can also be called "proxies" in this description even though fake program modules may be not exactly proxies in some embodiments of the invention. Generally, the fake program modules perform substantially reduced functions of real processes. For example, the fake processes can imitate successful or even delayed receiving data from interfaces of real processes, and should mostly perform functions of real processes when it comes to outputting data to the interfaces.

The proxy processes are used, since almost identical instances of one container need to be executed on two or more different cluster nodes. To reduce resource, consumption the certain real process should only be executed on one of the nodes (not on both of them). Thus, an imitation processes (proxy) are implemented on other cluster node or nodes in order to perform functions of corresponding real process required for another instance of the certain container for effective operation. In this way, functions of processes along with resource consumption required for those functions may migrate among instances of the containers to improve load balancing or even the overall system effectiveness. This algorithm is referred to here as "process migration". Note that a Container preferably has multiple real processes, and these processes can be distributed across multiple cluster nodes. If necessary additional container instances on additional node can be established, preferably from a set of fake program modules. For example, if a process is migrated from one physical node to another, a proxy of this process may be left instead on the original process in order to imitate that the process is still executing at the same location and produces and consumes data required for other processes for real processes as well as for other fake program modules. All the signals, requests and data still travel between proxies and corresponding real processes interfaces in any combination.

In one embodiment of the invention, only proxies connected to real processes send data to interfaces of real processes that correspond to the proxy. In other embodiments, broadcasting of data from interfaces may be performed.

In one embodiment, a cluster control system can be viewed as a distributed OS for the cluster. The cluster control system manages task executions, users and resources. The cluster control system allocates cluster resources between multiple user tasks running on different nodes. In order to do this, the cluster control system can have a task queue or a set of queues and allocate nodes for task executions in such a way that the cluster's computation capacity is used to a maximum and the results are collected in an efficient manner. According to the exemplary embodiment, the cluster control system operates with multiple Containers residing on the nodes of the cluster, including the Containers distributed over several nodes of the cluster. The Container processes can be migrated to different nodes of the cluster (leaving proxy processes behind).

The cluster control system can send the task for execution on the particular cluster nodes not only as they become available, but also to provide optimal loads on all of the nodes. In other words, each node performs tasks proportional to its capacity and does not remain unused for long periods of time. This process is referred to as a load balancing. A static load balancing is implemented when a load distribution is determined prior to launch of an application (task), while a dynamic load balancing is performed on-the-fly (during the execution of the task) based on changes of properties of the cluster and the user requirements.

The dynamic balancing provides for cluster scalability—an ability of the cluster to change a number of nodes and the connections between the nodes. In other words, the dynamic balancing allows for redistribution of the tasks that are already running. According to the exemplary embodiment, a process migration is used for dynamic load balancing. The migration allows for moving a process from one node to another without re-launching the process. Thus, the migration allows for satisfaction of changing user requests and tasks in terms of system resource usage.

Another function of the cluster control system is protection from failures and crashes. During cluster operation, one (or more) node can fail. In this case, all computations and data from this cluster node can be lost. The system has to react to node failures and re-launch the tasks that are not completed due to the failure of the node. However, a simple re-launch of an application leads to a loss of a large portion of computation results and, consequently, to a loss of time. In order to avoid this, control points mechanism CRIU (Checkpoint/Restore in User space) is used. The control points mechanism provides for storing a state of the applications and TCP connections at different points. Thus, the approach described herein can provide a partial illusion of migration processes with their connections and settings from one Container to another. Then, the application can be started form the last check point on a different node. In this case, only the computations executed from the last control point to the moment of the node failure are lost.

The control point is an image of the process address space and can be created by two approaches—(1) by a sequential storing or (2) by a non-blocking storing. The sequential storing saves only the memory portions that have been changed since the last save. The non-blocking storing creates copies of memory pages that the process attempts to gain access to. Thus, the process execution continues from the page copy. The non-blocking storing can slow down the server during the actual save operation and requires much larger volume of the disk memory than the sequential storing. According to the exemplary embodiment Container processes can be migrated and connected to each other via sockets (instead of a pipe connection).

According to the exemplary embodiment, a Meta PC uses kernel-level operations for the main modules. The Meta PC system uses adaptive algorithms for efficient resource allocation and provides for a low cost scalability and control of the clusters. The essence of the Meta PC is providing a functionality of several work stations and servers (nodes) as a one computational unit. The Meta PC joins Containers running on different nodes of a cluster by implementing process integration functionality.

The Meta PC controls changes in resource usage by cluster nodes and migrates places of processes execution from one node to another. It may be done using load balancing, for example, for and preventing critical reduction of a free memory available to the Containers. Meta PC is a scalable technology, which enhances overall cluster performance by using dynamic balancing and redistribution of loads and resources among the nodes and Containers of the cluster or cluster-based cloud structure of any size. The Meta PC can support multi-user mode of computation time distribution for running sequential and parallel tasks.

According to the exemplary embodiment, the main advantage of the proposed system is that it joins computer Containers. The Meta PC joins the capacities of the different hardware nodes by substitution real processes by process proxies or, in other word, by fake processes that imitate required part of behavior of the real processes which treat useful code.

This algorithm reacts to changes of load on a node or to process parameters in real-time. This scheme dominates until a critical lack of resources occurs—e.g., free memory and or processor slots are used up. The load volume is received from the node OS via a utility running on the node that use an OS API or by asking the task scheduler. An algorithm for prevention of memory exhaustion works when memory usage by a process (or processes) reaches a threshold in order to avoid swapping. The algorithm is triggered when a node starts a memory page, which increases available free memory. In this case, the algorithm replaces load balancing algorithm and attempts to migrate the process to the node, which has free memory sufficient for migration. This node has a lesser load than the node from which the process is being migrated.

Those skilled in the art will appreciate that the proposed method and system provide for more efficient load balancing where a Container (or VM) can, for example, use available CPU from one node and use free memory from another node, unlike the conventional load balancing, which basically fits a Container/VM onto a host, that has sufficient resources. In other words, the load balancing is, advantageously, performed for individual independent resources (e.g., CPU time, memory, network bandwidth and disk bandwidth).

FIG. 1 illustrates a portion of a cluster with Containers running on the cluster nodes, in accordance with the exemplary embodiment. Hardware nodes 130 and 140 have Containers 110 and 120 (respectively) residing on them. The processes inside the Containers are depicted as solid circles. The dotted circle inside the container 110 illustrates a process, which is migrated from another Container in order to balance the load. The dotted circles inside the container 120 illustrate imitation of Container processes—i.e., proxy processes.

The proxy processes are used when a process needs to be executed on a Container, which runs on two (or more) different computers (cluster nodes). The process can only be executed on one of the nodes (not on both of them). Thus, an imitation process (proxy) is implemented in order to unload one of the Containers. For example, if a process is migrated from one physical node to another, a proxy of this process is left at the original location in order to imitate that the process is still executed at the same location. All the signals and requests still go to the proxy, which intercepts them and sends them to a real process executed on another node. This can reduce the speed slightly compared to a local signal/request delivery. However, the benefit of process migration usually outweighs a possible speed reduction.

A special switch is implemented using IPC (Inter Process Communication) in order to send data between the proxy and the real process. The proxy of the real process receives the process call, but it does not know where the real process lives. Thus, the proxy sends the call data to a switch, which redirects the request to the node where the real process resides. The real process distributes its interface communications and data among the corresponding proxies on other nodes. Here the proxies are the way to secure distribution of real processes communication among cluster in such a way that data addressed by real process to another real process receive corresponding process unaware on which node recipient lives.

The exemplary embodiment of compiling network for interface data distribution is disclosed in U.S. patent application Ser. No. 14/710,876, Filed: May 13, 2015, entitled VPN FOR CONTAINERS AND VIRTUAL MACHINES IN LOCAL AREA NETWORKS, incorporated herein by reference in its entirety.

The proposed approach advantageously, optimizes the resources usage. For example, a node has certain CPU and memory resources and the Container launched on the node uses up all available CPU time while some memory is still available. According to the exemplary embodiment, another node, may have sufficient CPU resource for managing a part of the said container. The proposed approach enables moving part of the Container's processes to another node in a live mode.

Management procedures, in accordance with the exemplary embodiment, are operations for monitoring data of processes being executed and passing data between the real processes and the imitated processes from one Container to another. Each physical node has a manager module and a cluster has a manager module, which communicates with the individual node managers. Balance operations are intended to balance the loads on the nodes of the cluster. The balancer module monitors the loads on the nodes and selects the Containers and processes for load redistribution. This arrangement is flexible and scalable, because the components are used as separate blocks.

Figure 2:
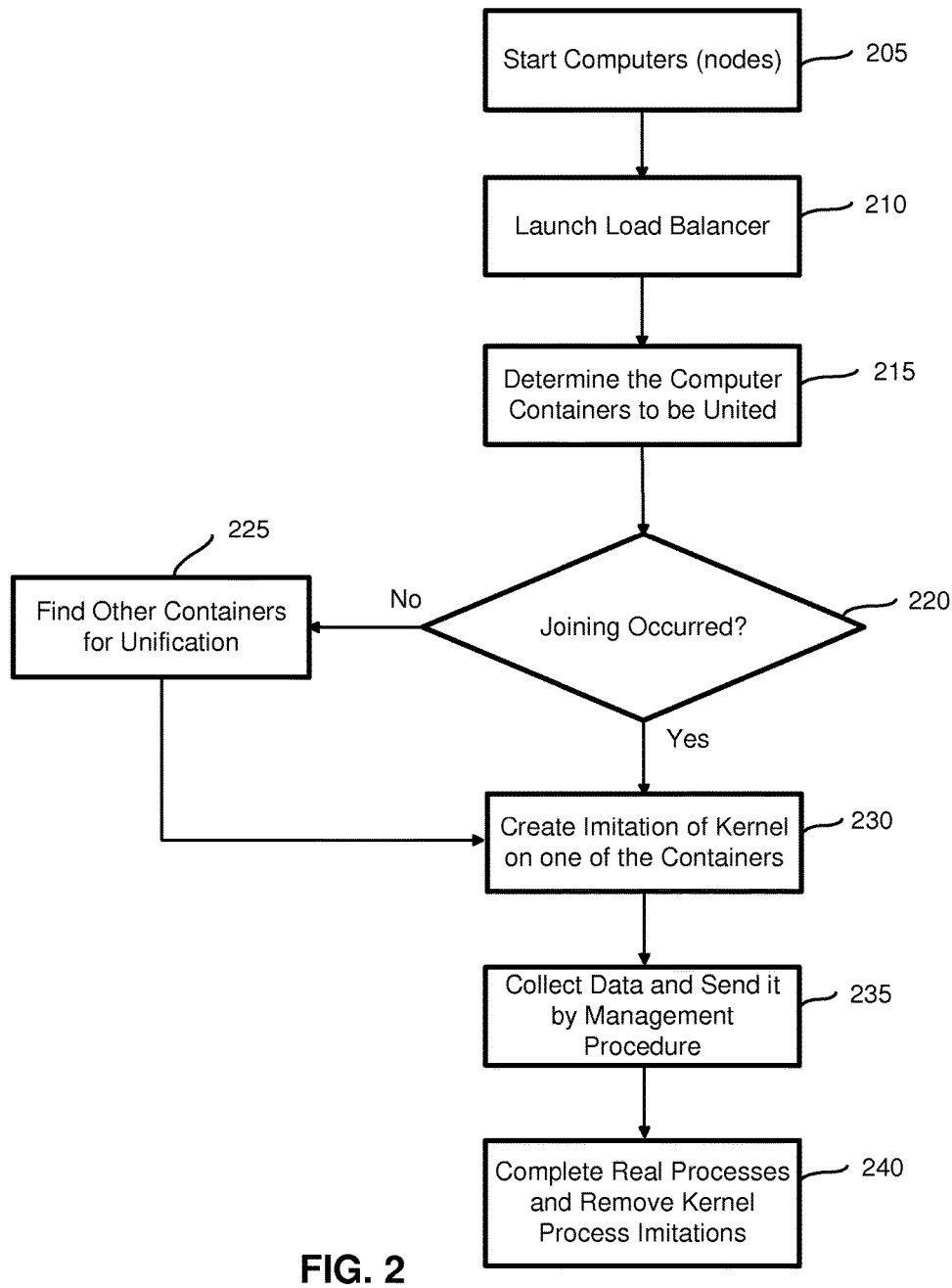
FIG. 2 illustrates a flow chart of a method for load balancing among Containers residing of different nodes of a cluster, in accordance with the exemplary embodiment.

FIG. 2 illustrates a flow chart of a method for load balancing among Containers residing of different nodes of a cluster, in accordance with the exemplary embodiment. In step 205, the process starts computers (nodes) of a cluster. A load balancer is launched in step 210. The process determines the Containers located on the nodes to be joined in step 215. If a joining of the Containers has occurred in step 220, the process creates an imitation of a kernel on one of the containers in step 230. Otherwise, the process finds other containers for joining in step 225. In step 235, the process collects data and sends it by management procedure to another container. Then, the process completes the real processes and removes the kernel process imitations (proxies) in step 240.

According to the exemplary embodiment, one Container can use, for example 2.5 physical nodes, where it uses half of one node's available resources, 1.0 of another node's, and 1.0 of the original node's. This is a novel approach, because it requires joining of the Containers. The load balancer determines which nodes are available for hosting a Container. The load balancer analyzes the loads on physical servers (nodes) and redistributes the loads by selecting what Containers to join. Distribution of the Containers uses proxies (i.e., process imitations). In other words, if a first process needs to access a second process, which has been moved to another node, the first process accesses the proxy of this process instead. The proxy intercepts the signal from the first process and translates it to the second process. If the container is distributed over three (or more) physical nodes, the real process executes on one of the nodes and the other nodes have the corresponding process proxies implemented on them.

If the real process is moved (migrated) from a Container on one node to another node, the proxy of this process is left inside the Container. In other words, the migrated process on a target ("new") node can be accessed via the proxy at its old location. If the real process is removed from a Container, the corresponding proxies are also removed. When the process is moved, it can be re-launched from a latest control point saved prior to process migration. If process proxies exchange data between each other using process APIs, this data is ignored and does not affect the real process imitated by the proxies.

Figure 3:
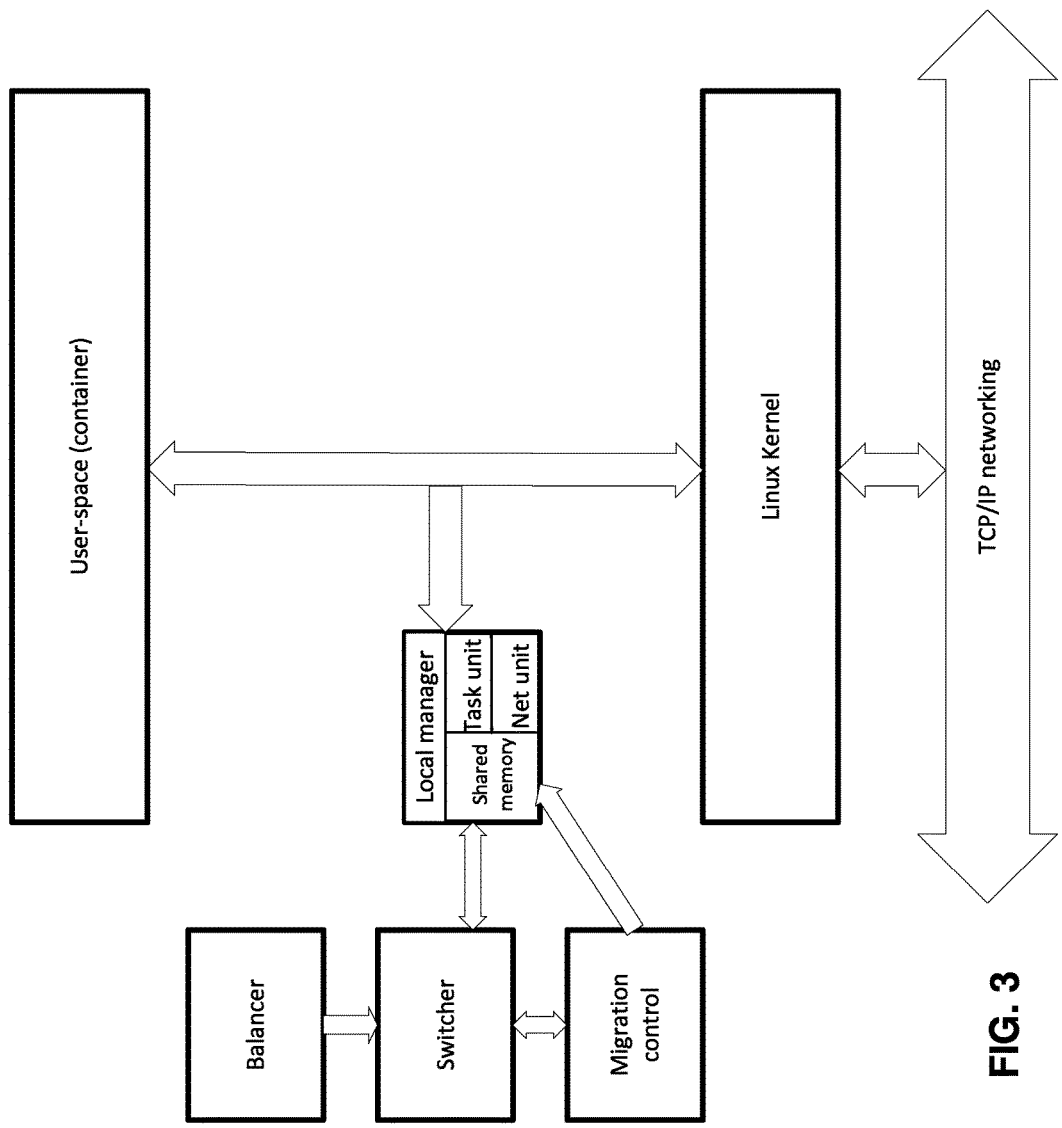
FIG. 3 illustrates a Container manager implemented inside the Meta PC system, in accordance with the exemplary embodiment.

These processes are controlled by Container manager implemented inside the Meta PC system depicted in FIG. 3.

According to the exemplary embodiment, the PStorage concept (i.e., joining many small disks to create a virtual large one) is extended to other resources—CPU, memory and network capacity. A cluster of PCs (or servers) is assembled into one large Meta PC system. The VMs and Containers are launched on the Meta PC, which has the volumes of CPU resources and RAM equal the sum of the respective resources on the underlying PCs.

Note that when node resources are combined, the resulting resource is smaller than the sum of the combined resources, because of the resources are used for the actual combination of the PCs. For example if each of the nodes have 2 GB of memory, the combination will usually have less than 4 GB. With the proposed system, not only VM/CT will transparently run on some real PC, but a VM/CT is created that spans across two or more PCs. For example, if 4 PCs with 2 cores are joined, up to 8-cores can be used for VM/CT. This is what makes Meta PC differ from a conventional cluster, because a hosting server sees the Meta PC as one powerful server, on which a large number of Containers/VMs can run.

According to the exemplary embodiment, a process migration uses a parasite code. The parasite code is a binary blob of code built in PIE (position-independent executable) format for execution inside another process address space. The main purpose of the parasite code is to execute CRIU (Checkpoint/Restore in User space) service routines inside dumpee tasks address space. The position-independent code (PIC) or position-independent executable (PIE) is a body of machine code that, being placed somewhere in the primary memory, executes properly regardless of its absolute address. Position-independent code can be executed at any memory address without modification.

This differs from re-locatable code, where a link editor or program loader modifies a program before execution, so that it can be run only from a particular memory location. Position-independent code must adhere to a specific set of semantics in the source code and compiler support is required. Instructions that refer to specific memory addresses, such as absolute branches, must be replaced with equivalent program counter relative instructions. Data references from position-independent code are usually made indirectly, through global offset tables (GOTs), which store the addresses of all accessed global variables.

According to the exemplary embodiment, the process migration from one Container to another employing a proxy running in place of a migrated process uses parasite service routines for preserving a state of a process prior to migration. All architecture independent code calling for parasite service routines is sitting in parasite-syscall.c file. When the parasite code needs to be run inside some dumpee task the following is done:

1. Move task into that named seized state with ptrace (PTRACE_SEIZE, . . . ) helper (thus, the task gets stopped, but does not notice that someone outside is trying to manipulate it). ptrace is a system call found in several UNIX and UNIX-like operating systems. By using ptrace (the name is an abbreviation of "process trace") one process can control another, enabling the controller to inspect and manipulate the internal state of its target.

2. Inject and execute mmap syscall inside dumpee address space with help of ptrace system call, because we need to allocate a shared memory area which will be used for parasite stack and parameters exchange between the CRIU and a dumpee.

Open local copy of shared memory space from/proc/$PID/map_files/, where $PID is a process identifier of a dumpee. All these actions are gathered in parasite_infect_seized( ) helper. Once the parasite is prepared and placed into dumpee address space, CRIU can call for parasite service routines that can be used for migrate process using check points.

There are two modes the parasite can operate in:
Trap mode; and
Daemon mode.

In trap mode, a parasite simply executes one command and yields a CPU trap instruction, which CRIU intercepts. This is a one command at a time mode. In a daemon mode (as the name implies), the parasite behaves like a UNIX daemon—i.e., it opens a UNIX socket and start listening for commands on it. Once a command is received, it gets handled and a daemon returns result back via the socket packet, then it continues listening for the next command, etc. Commands are assembled as PARASITE_CMD_ . . . enum in parasite.h header.

Parasite bootstrap lives in parasite-head. S file and simply adjusts its own stack and literally calls the daemon entry point. Right after the call is made, a trapping instruction is placed in the code to trigger the notification to a caller that the parasite has finished its work, if it has been running in a trap mode. When a parasite runs in a daemon mode, the notifications are more complex.

Parasite daemon code lives in pie/parasite.c file. Its entry point is parasite_daemon( ). Upon entry, it opens command socket, which is used to communicate with the caller. Once the socket is opened, the daemon comes to sleep waiting for command to appear. Because the entire parasite memory block is a shared memory slab, the data exchanged between CRIU and dumpee is regular read/write operations into arguments area while commands are sent as network packets.

Once everything is done and a parasite is no longer needed, it is removed from the dumpee address space in several steps:

1. CRIU starts tracing the syscalls parasite is executing with the help of ptrace;
2. Send PARASITE_CMD_FINI to parasite via control socket;
3. Parasite receives it, then closes control socket and executes rt_sigreturn( ) system call;
4. CRIU intercept exit from this syscall and un-maps parasite memory area, thus a "victim" comes into the state it was before parasite injection.

Figure 4:
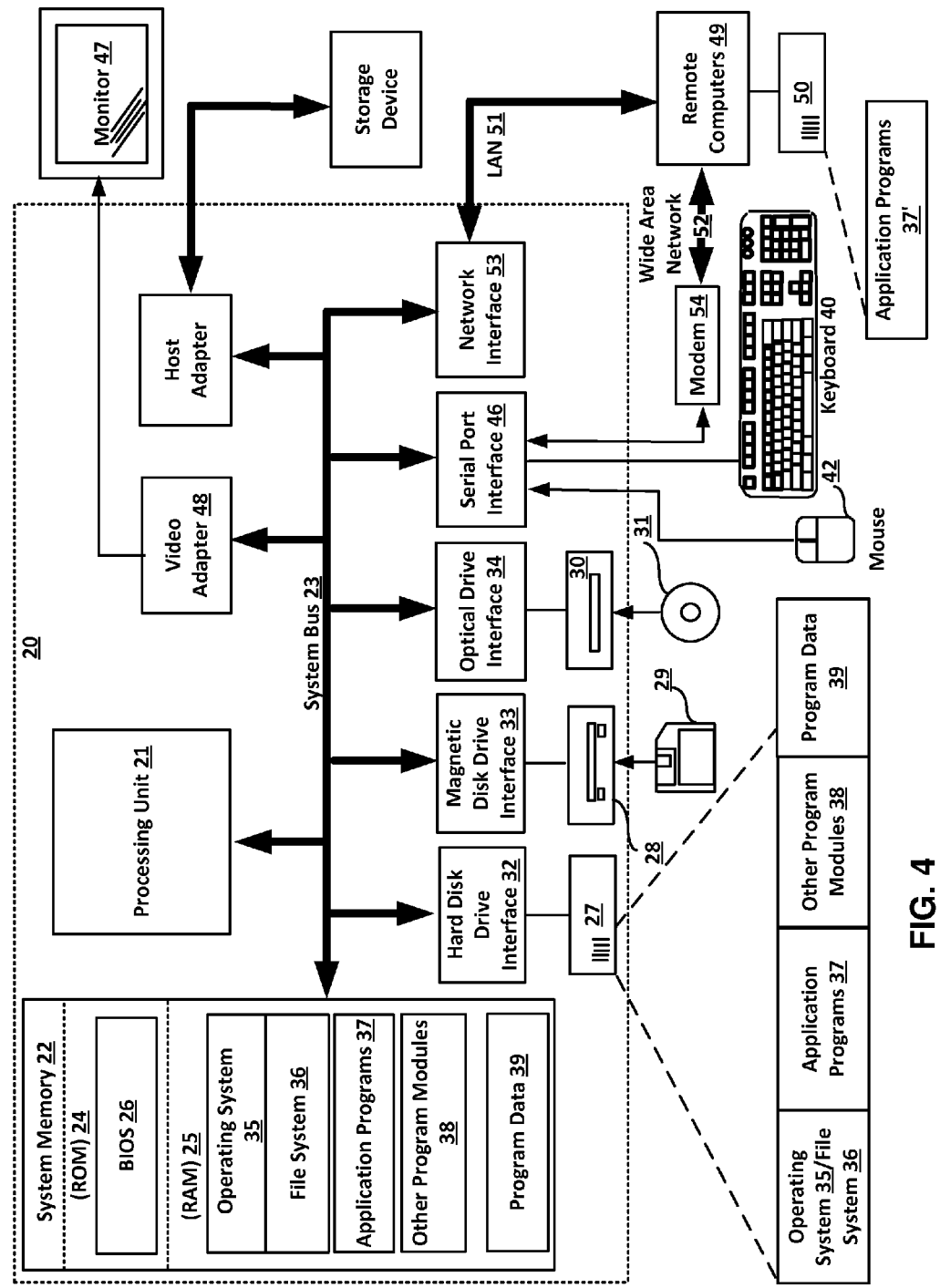
FIG. 4 illustrates a schematic of an exemplary computer system that can be used for implementation of the invention.

With reference to FIG. 4, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A computer-implemented method for joining containers running on a cluster of hardware nodes, the method comprising:
   on a plurality of nodes connected into a cluster, starting a plurality of containers,
   where each node hosts at least one container;
   executing a plurality of real processes in the containers, where each real process is executed on a single container and other containers execute fake program modules corresponding to the real process;
   determining the real process on a source container to be migrated and a target container where the real process is to be migrated;
   for the target container, replacing the fake program module with the real process and replacing the real process with the fake program module on the source container; and
   re-launching a process on the same hardware node with live settings from another node,
   wherein the fake program module includes interfaces identical to interfaces of a corresponding real process;
   wherein interfaces of real processes are connected to corresponding interfaces of the corresponding fake program modules so as to establish output data flow of the corresponding interfaces of corresponding fake program modules identical to the data flow outputted by interfaces of a corresponding real process; and
   wherein interfaces of the fake program modules are configured to receive data from conjugated interfaces.

2. The method of claim 1, further comprising disconnecting interfaces of the real processes from corresponding interfaces of the fake processes when the interfaces of real processes are connected to interfaces of other real processes of the same container.

3. The method of claim 1, further comprising discarding data flows directed from the real processes to the fake program modules received at the interfaces of the fake program modules connected to interfaces of another program module.

4. The method of claim 1, further comprising storing data of the real processes.

5. The method of claim 1, further comprising applying a check point method to distribution of the real processes and the fake program modules for minimizing computational losses.

6. The method of claim 5, wherein the check point method is Checkpoint/currently amended in User space (CRIU) method.

7. The method of claim 5, wherein the checkpoint method provides for the re-launching of the process.

8. A system for joining containers running on a cluster of hardware nodes, the system comprising:
   a plurality of nodes connected into a cluster, each node having a processor;
   a plurality of containers running on the nodes, wherein each node hosts at least one container;
   a plurality of real processes executing in the containers, wherein each real process is executed on a single container and other containers execute fake program modules corresponding to the real process on their respective processors;
   wherein the system determines the real process on a source container to be migrated and a target container where the real process is to be migrated;
   for the target container, the system replaces the fake program module with the real process and replaces the real process with the fake program module on the source container; and
   the system re-launches a process on the same hardware node with live settings from another node,
   wherein the fake program module includes interfaces identical to interfaces of a corresponding real process;
   wherein interfaces of real processes are connected to a corresponding interfaces of the corresponding fake program modules so as to establish output data flow of the corresponding interfaces of corresponding fake program modules identical to the data flow outputted by interfaces of a corresponding real process; and
   wherein interfaces of the fake program modules receive data from conjugated interfaces.

9. The system of claim 8, wherein interfaces of the real processes are disconnected from corresponding interfaces of the fake processes when the interfaces of real processes are connected to interfaces of other real processes of the same container.

10. The system of claim 8, wherein data flows directed from the real processes to the fake program modules are discarded when the data flows are received at the interfaces of the fake program modules connected to interfaces of another program module.

11. The system of claim 8, wherein the system applies a check point method to distribution of the real processes and the fake program modules for minimizing computational losses.

12. The system of claim 11, wherein the check point method is Checkpoint/Restore in User space (CRIU) method.

13. The system of claim 11, wherein the checkpoint method provides for the re-launching of the process.

14. A non-transitory computer storage medium storing computer code for implementing a method for joining containers running on a cluster of hardware nodes, the method comprising:
   on a plurality of nodes connected into a cluster, starting a plurality of containers,
   where each node hosts at least one container;
   executing a plurality of real processes in the containers, where each real process is executed on a single container and other containers execute fake program modules corresponding to the real process;
   determining the real process on a source container to be migrated and a target container where the real process is to be migrated;
   for the target container, replacing the fake program module with the real process and replacing the real process with the fake program module on the source container; and
   re-launching a process on the same hardware node with live settings from another node,
   wherein the fake program module includes interfaces identical to interfaces of a corresponding real process;
   wherein interfaces of real processes are connected to corresponding interfaces of the corresponding fake program modules so as to establish output data flow of the corresponding interfaces of corresponding fake program modules identical to the data flow outputted by interfaces of a corresponding real process; and
   wherein interfaces of the fake program modules are configured to receive data from conjugated interfaces.

* * * * *